United States Patent Office 2,880,068
Patented Mar. 31, 1959

2,880,068

PRODUCTION OF DIBORANE

Stanley J. Chiras, Niagara Falls, N.Y., assignor, by mesne assignments, to Olin Mathieson Chemical Corporation, a corporation of Virginia No Drawing. Application August 2, 1954
Serial No. 447,385

4 Claims. (Cl. 23—204)

My invention relates to an improved method for the production of diborane.

It has heretofore been proposed to prepare diborane by reacting sulfuric acid and an alkali metal borohydride. For example, when the process is carried out using sodium borohydride, the reaction can be represented as follows:

$$2NaBH_4 + 2H_2SO_4 = B_2H_6 + 2NaHSO_4 + 2H_2$$

As a practical matter, however, the reaction between the sulfuric acid and the alkali metal borohydride is somewhat difficult to carry out because of the fact that sparking (the burning of sodium borohydride and/or diborane) occurs, so that the reaction does not proceed smoothly at atmospheric pressure and yields are decreased.

In accordance with my present invention, I have discovered a way for substantially preventing the undesirable sparking which normally occurs when sulfuric acid and an alkali metal borohydride are reacted. I accomplish this by carrying out the reaction while the alkali metal borohydride is slurried in admixture with a chlorobenzene, such as monochlorobenzene. The borohydride is added to the sulfuric acid.

The following example illustrates in detail the practice of my invention in the production of diborane and is to be considered not limitative. In the example, the term "millimoles" means milligram moles.

EXAMPLE

In Experiment F of this example, a slurry composed of 97.13 millimoles of sodium borohydride and 397 millimoles of monochlorobenzene was added dropwise to 992 millimoles of sulfuric acid (96 percent) over a period of 0.83 hour. In carrying our Experiment F, the sulfuric acid was placed in a reaction flask and the sodium borohydride-monochlorobenzene slurry was placed in an addition assembly. All air was removed from the system by alternately evacuating and flushing the system with nitrogen. Then, with nitrogen sweeping through the reactor and with two traps cooled by liquid nitrogen in place the slurry was added to the vigorously stirred acid. After all of the slurry had been added, the system was evacuated and the condensed gases were fractionated and measured. The product was collected for 0.44 hour after the addition of the slurry had been completed. At the end of this period, 35.8 millimoles of diborane had been collected, representing a 74 percent by weight uncorrected yield of diborane, based on sodium borohydride.

Experiment R was performed similarly, 35.40 millimoles of sodium borohydride being added, by means of a solids-addition apparatus, to a mixture composed of 652 millimoles of sulfuric acid (96 percent) and 393.4 millimoles of monochlorobenzene. The addition required 0.83 hour for completion. The diborane was collected for an additional 0.25 hour period. Diborane (13.24 millimoles) was evolved, representing a 75 percent by weight yield based on the sodium borohydride.

In Experiment S, a slurry composed of 85.47 millimoles of sodium borohydride and 309.7 millimoles of trichlorobenzene was added to 1350 millimoles of sulfuric acid. The trichlorobenzene employed was commercial mixed trichlorobenzenes consisting essentially of a mixture of 1,2,3-trichlorobenzene and 1,2,4-trichlorobenzene, predominating in the latter. The addition of the sodium borohydride required 0.69 hour for completion. The diborane which was evolved was collected in traps which were cooled to −196° C. The reaction mixture was stirred for an additional 0.2 hour. Diborane (32.2 millimoles) was prepared representing a 77 percent by weight yield based on the sodium borohydride.

The results of Experiments F, R and S and additional experiments in which the reaction conditions were varied widely are summarized in Table I. In all of the experiments of Table I, the reaction was performed at room temperature, with the exception of P which was conducted at 0° C.

*Table I*

| Experiment | A | B | C | D | E | F | G | H | J |
|---|---|---|---|---|---|---|---|---|---|
| Principal Variables: | | | | | | | | | |
| Reaction Time, hrs | 1.47 | 2.07 | 1.02 | 1.23 | 1.15 | 1.27 | [3] 22.0 | [3] 19.42 | 1.09 |
| Addition Time, hrs | 0.58 | 0.75 | 0.15 | 0.22 | 0.15 | 0.83 | 0.84 | 0.84 | 0.84 |
| $H_2SO_4/NaBH_4$ (mole) | 13.7 | 13.6 | 13.6 | 10 | 6.85 | 9.92 | 7.15 | 6.0 | 2.13 |
| $NaBH_4/C_6H_5Cl$ (mole) | 0.548 | 0.924 | 0.924 | 0.244 | 0.23 | 0.253 | 0.251 | 0.241 | 0.248 |
| Materials in, millimoles: | | | | | | | | | |
| $NaBH_4$ | [3] 93.1 | [3] 92.8 | [3] 94.4 | 98.2 | 93.8 | [1] 97.13 | [1] 96.24 | [1] 94.97 | [1] 100.07 |
| $H_2SO_4$[2] | 1,342 | 1,330 | 1,330 | 985 | 672 | 992 | 697 | 569 | 214 |
| $C_6H_5Cl$ | 179 | 106.5 | 106.8 | 411 | 422 | 397 | 387 | 394 | 410 |
| $C_6H_3Cl_3$ | 0 | 0 | 0 | 0 | 0 | 0 | 0 | 0 | 0 |
| Materials Out, millimoles: | | | | | | | | | |
| $B_2H_6$ | 32.9 | 33.8 | 31.5 | 28.04 | 30.2 | 35.8 | 36.47 | 35.41 | 26.78 |
| Boron in residue | 23.9 | 21.12 | 28.24 | 35.34 | 29.94 | 25.45 | 21.43 | 18.18 | 20.99 |
| Percent Uncorrected Yield $B_2H_6$ (Based on $NaBH_4$) | 71 | 73 | 67 | 57 | 64 | 74 | 76 | 75 | 53 |
| Percent Yield $B_2H_6$ (based on $NaBH_4$) | 74 | 77 | 70 | 64 | 68 | 74 | 78 | 81 | 79 |

See footnotes at bottom of table.

Table I—Continued

| Experiment | K | L | M | N | P | Q | R | S |
|---|---|---|---|---|---|---|---|---|
| Principal Variables: | | | | | | | | |
| Reaction Time, hrs | 1.20 | 1.08 | 1.47 | 1.39 | 0.65 | 1.58 | 1.08 | 0.89 |
| Addition Time, hrs | 0.87 | 1.08 | 1.00 | 1.00 | 0.15 | 1.25 | 0.83 | 0.69 |
| $H_2SO_4/NaBH_4$ (mole) | 80.5 | 13.5 | | | 13.2 | 12.8 | 18.6 | 14.8 |
| $NaBH_4/C_6H_5Cl$ (mole) | 0.248 | 0.241 | | | 0.239 | [6] 0.242 | [7] 0.885 | |
| Materials in, millimoles: | | | | | | | | |
| $NaBH_4$ | [1] 99.09 | [3] 97.02 | [3] 90.6 | [3] 98.3 | [3] 95.7 | [3] 93.4 | [1] 35.4 | [3] 85.47 |
| $H_2SO_4^2$ | 7,970 | 1,306 | [5] | [5] | 1,304 | 1,260 | 652 | 1,350 |
| $C_6H_5Cl$ | 399 | 402 | [4] | [4] | 411 | 406 | 393.2 | 0 |
| $C_6H_3Cl_3$ | 0 | 0 | 0 | 0 | 0 | 0 | 0 | 309.7 |
| Materials Out, millimoles: | | | | | | | | |
| $B_2H_6$ | 36.62 | 35.99 | 32.5 | 32.0 | 35.6 | 31.3 | 13.24 | 32.2 |
| Boron in residue | 25.70 | | | 77.98 | 23.4 | 29.9 | 9.46 | 20.07 |
| Percent Uncorrected Yield $B_2H_6$ (based on $NaBH_4$) | 74 | 74 | 66 | 65 | 74 | 67 | 75 | 75 |
| Percent Yield $B_2H_6$ (based on $NaBH_4$) | 74 | | | 73 | 75 | 68 | 75 | 77 |

[1] 95 percent purity, corrected to 100 percent purity.
[2] 95.5 percent purity.
[3] 94 percent purity, corrected to 100 percent.
[4] Chlorobenzene recycled in M after recovery from reaction residue of L and in N from residue of M.
[5] Sulfuric Acid recycled in M after recovery from residue of L and recycled in N after recovery from residue of M.
[6] Sodium borohydride-chlorobenzene slurry added under surface of sulfuric acid.
[7] Sodium borohydride added to mixture of chlorobenzene and sulfuric acid.
[8] Extended reaction times used to determine whether or not much diborane was liberated after the addition was completed.

Various modifications can be made in the procedures of the specific experiments described above and in Table I to provide other embodiments which fall within the scope of the present invention. Thus, in place of the sodium borohydride employed, there can be substituted other alkali metal borohydrides, such as lithium borohydride and potassium borohydride. Likewise, in place of the monochlorobenzene and commercial mixed trichlorobenzene used, there can be substituted other chlorobenzenes and mixtures thereof which are liquid under the reaction conditions, for example, 1,2-dichlorobenzene; 1,3-dichlorobenzene; 1,2,4-trichlorobenzene and the like.

The relative proportion of alkali metal borohydride to sulfuric acid used is not critical and can be varied widely. Thus, in the specific experiments, the molar ratio of sulfuric acid to sodium borohydride varied over the range 2.13 to 80.5 without appreciable effect upon the yield of diborane. Also, the relative amounts of alkali metal borohydride to chlorobenzene can be varied considerably without appreciable effect upon the reaction. Thus, in the experiments the molar ratio of sodium borohydride to monochlorobenzene was varied from about 0.2 to about 0.9. Finally, the reaction temperature employed is subject to considerable variation, the specific experiments illustrating reaction temperatures of 0° C. and room temperature.

I claim:

1. In the preparation of diborane by reacting sulfuric acid and an alkali metal borohydride, the step of effecting the reaction while the alkali metal borohydride is slurried in admixture with at least one chlorobenzene, the amount of chlorobenzene being sufficient substantially to prevent sparking and the borohydride being added to the sulfuric acid.

2. A method according to claim 1 in which the alkali metal borohydride is sodium borohydride.

3. A method according to claim 1 in which the chlorobenzene is monochlorobenzene.

4. A method according to claim 1 in which the chlorobenzene is commercial mixed trichlorobenzenes consisting essentially of a mixture of 1,2,3-trichlorobenzene and 1,2,4-trichlorobenzene, predominating in the latter.

No references cited.